April 23, 1968  D. W. ROBERTSON  3,378,888
STRUCTURE FOR VACUUM FORMING OF THERMOPLASTIC
MATERIAL ON UNDERCUT FLEXIBLE MOLDS
Filed Oct. 19, 1965
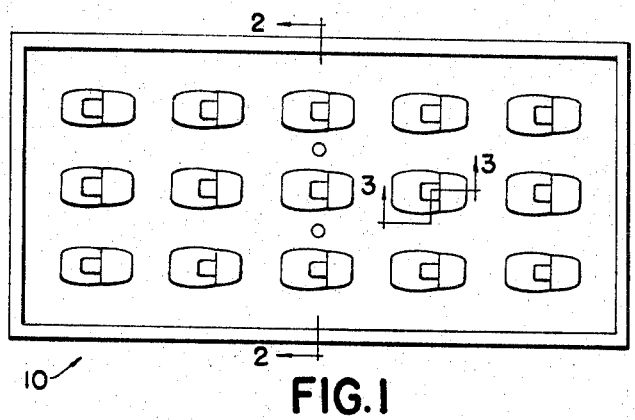
FIG. 1
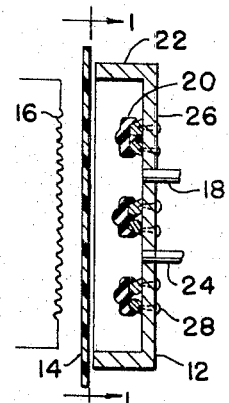
FIG. 2
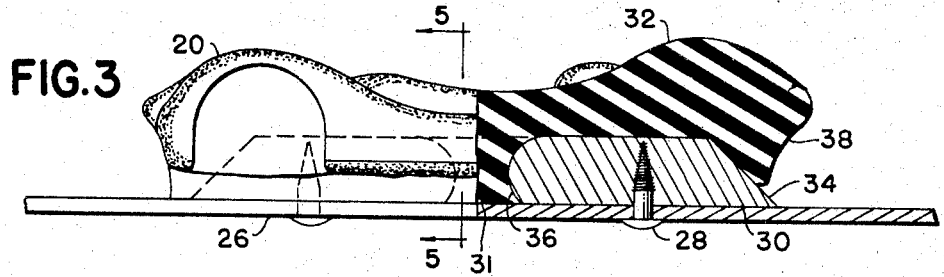
FIG. 3
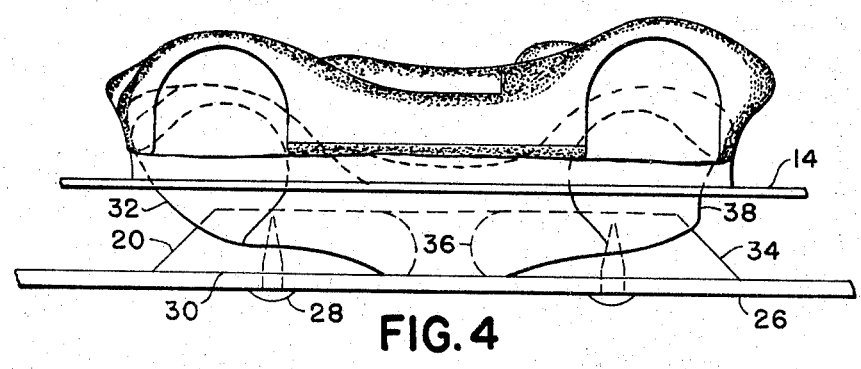
FIG. 4
FIG. 5
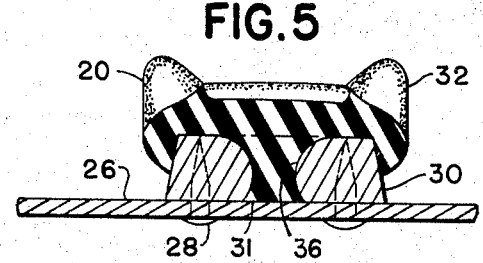
INVENTOR.
DUANE W. ROBERTSON
BY Whittemore,
Hulbert & Belknap
ATTORNEYS

United States Patent Office 3,378,888
Patented Apr. 23, 1968

3,378,888
STRUCTURE FOR VACUUM FORMING OF THERMOPLASTIC MATERIAL ON UNDERCUT FLEXIBLE MOLDS
Duane W. Robertson, Utica, Mich., assignor to Holley Plastics Company, Warren, Mich., a corporation of Michigan
Filed Oct. 19, 1965, Ser. No. 497,645
4 Claims. (Cl. 18—35)

ABSTRACT OF THE DISCLOSURE

Vacuum forming structure for producing articles having deep undercuts including a vacuum forming tray and a plurality of molds positioned in said tray, each mold including a core of heat dissipating material having sides sloping toward the center thereof upwardly of the tray and an opening through the center thereof having a venturi like cross section with the diameter thereof being larger at the top and bottom of the core than it is centrally of the core and changing smoothly to blend in with the top of the core and a flexible mold body member having an undercut outer periphery, a bottom having outer edges engaged with the sloping outer edges of the core, and a central portion extending completely through and filling the venturi like opening through the core whereby the mold body member may be deformed upwardly and toward the center thereof on removal of a vacuum formed article therefrom without damage to the article or the mold body member and without separating the mold body member from the mold core.

---

Vacuum forming of articles from thin sheets of thermoplastic material such as polyethylene or cellulose acetate butyrate is a relatively inexpensive method of producing plastic articles. However, in the past vacuum forming has not been used to any great extent in producing plastic articles having severe undercuts due to the difficulty in removing the plastic articles from the molds over which they are formed.

Where plastic articles in the past have been formed from thermoplastic sheets or the like expensive molds having retractable portions for forming the undercut surfaces have been used. Such molds are complicated, expensive, and often inefficient.

It is, therefore, one of the objects of the invention to provide improved mold structure.

Another object is to provide mold structure for vacuum forming plastic articles having severe undercuts from thin sheets of plastic.

Another object is to provide mold structure for vacuum forming plastic articles having severe undercuts including a flexible member in the form of the article and means for securing a portion of the mold in spaced relation from the undercuts in a fixed position.

Another object is to provide mold structure for vacuum forming plastic articles having severe undercuts including an aluminum core having an opening therethrough centrally thereof, means for securing the aluminum core in a fixed position, and a flexible mold body member including a portion extending through the opening and positioned over the core having the general configuration of the article to be produced and having severely undercut surfaces.

Another object is to provide apparatus for vacuum forming plastic articles having severe peripheral undercuts from thermoplastic sheets or the like including a tray over which the thermoplastic sheet may be positioned, means for heating the thermoplastic sheet, means for drawing a vacuum within the tray with the thermoplastic sheet positioned thereover and a plurality of molds secured to the bottom of the tray in spaced apart relation to each other each having a core of heat dissipating material and a flexible mold body member secured to the core centrally having the general configuration of the article to be formed.

Another object is to provide structure for vacuum forming articles having severe undercuts which is simple in construction, economical to manufacture, and efficient in use.

These and other objects and features of the invention will become apparent as the description proceeds, especially when taken in conjunction with the accompanying drawings illustrating a preferred embodiment of the invention wherein:

FIGURE 1 is a plan view of vacuum forming apparatus including mold structure constructed in accordance with the invention taken substantially on the line 1—1 in FIGURE 2.

FIGURE 2 is a cross section of the vacuum forming apparatus illustrated in FIGURE 1 taken substantially on the line 2—2 of FIGURE 1.

FIGURE 3 is an enlarged view of one of the mold structures illustrated in FIGURE 1 taken substantially on the line 3—3 in FIGURE 1.

FIGURE 4 is an elevation view of the mold structure illustrated in FIGURE 3 showing a finished vacuum formed plastic article partially removed from the mold structure.

FIGURE 5 is a cross section view of the mold structure illustrated in FIGURE 3 taken on the line 5—5 in FIGURE 3.

With particular reference to the figures of the drawing one embodiment of the present invention will now be considered in detail.

As shown best in FIGURE 1, the vacuum forming apparatus 10 includes a tray 12 over which a sheet of thermoplastic material 14 may be positioned, heaters 16 for heating the thermoplastic material 14 and means 18 for drawing a vacuum in the tray 12 with the thermoplastic sheet 14 positioned thereover. The separate mold structures 20 are positioned in spaced relation to each other within the tray 12 and have flexible mold body members having severe undercuts.

In operation, the sheet of plastic material 14 positioned over the tray 12 is heated by the heaters 16 and a vacuum is drawn in the tray 12 by the means for drawing a vacuum 18. The plastic material 14 is thus formed around the mold structures 20. When the plastic material 14 formed to correspond to the mold structures 20 is removed from the mold structures, the flexible body members are deformed as shown in FIGURE 4 to permit removal of the plastic material from the undercut portions of the molds 20.

More specifically, the tray 12 of the vacuum forming apparatus 10 may be constructed of metal and includes the peripheral flange 22 extending therearound. The thermoplastic sheet 14 may be polyethylene. The heaters 16 may be electric resistance heaters, the power supply for which is not shown. The means 18 for drawing vacuum in the tray 12 includes the pipes 24 but is not shown in greater detail. The mold structures 20 are secured to the bottom 26 of the tray 12 in spaced apart relation by convenient means such as screws 28.

The mold structures 20 as more particularly illustrated in FIGURES 3, 4 and 5 include a core 30 and a flexible mold body member 32. The mold core 30 is secured to the bottom 26 of the tray 12 by the screws 28 as previously indicated while the flexible mold body member 32 is secured to the core 30 centrally thereof.

The mold core 30 is constructed of aluminum to dissipate heat when the mold structure 20 is to be used over a sustained period. If the mold structure is to be used only intermittently, the core may be constructed of wood or the entire mold structure 20 may be of the flexible material secured directly to the bottom 26 of the tray 12. As shown, the core 30 includes a bevelled edge 34 around the outer periphery thereof and a central opening 36 extending therethrough having a venturi shape.

The flexible mold body member 32 is constructed of rubber or similar flexible material and includes the peripheral severely undercut surfaces 38. The flexible mold body member 32 is in the configuration of the finished article and is secured to the core 30 by a portion 31 extending through the opening 36 in the core 30 formed as shown.

In operation, as indicated above this sheet of thermoplastic material such as polyethylene is positioned over the horizontal tray 12. The heaters 16 are turned on to heat the plastic sheet 14 to an easily deformable temperature after which a vacuum is drawn by the vacuum drawing means 18 through the pipes 24 so that the plastic sheet 14 is formed around the mold structures 20.

On removal of the vacuum from the tray 12, the plastic sheet formed about the mold structures 20 which structures have deep undercuts therein as in the production of toy automobile bodies shown, is raised off of the mold structures 20. During the raising operation the flexible mold body members 32 are flexed away from the cores 30 as best shown in FIGURE 4. The central portions thereof however remain in fixed relation to the cores 30 and tray 12 as shown in FIGURE 4 due to the portion 31 of the mold body members received in the opening 36 in the cores 30. After the vacuum formed articles in the material 14 have been completely removed from the mold structures 20 the flexible body members 32 thereof are returned to the position illustrated in FIGURE 3 by the flexible nature of the material of which the body members 32 are constructed ready for a subsequent vacuum forming operation.

Thus it will be seen that mold structure is provided in accordance with the disclosure whereby articles having severe undercuts may be produced by vacuum forming rather than the more expensive injection molding. Furthermore, it will be readily understood that the mold structures 20 are simple, economical to manufacture and efficient in use.

While one embodiment of the present invention has been considered in detail, other embodiments and modifications are contemplated, and it is the intention to include all embodiments and modifications as are defined by the appended claims within the scope of the invention.

What I claim as my invention is:

1. Structure for vacuum forming articles having severe undercuts from thin thermoplastic sheets of material comprising a vacuum forming tray having a bottom and upwardly extending sides therearound, means for drawing a vacuum in the tray with the sheet of material placed thereover and a plurality of molds secured in the tray in spaced apart relation each including a mold core of heat dissipating material having an outer periphery sloping toward the center thereof upwardly from the bottom of the tray and an opening through the core centrally thereof having a venturi-like cross-section including larger diameter portions at the bottom of the core and the top of the core and a smaller diameter section centrally of the core changing gradually from the top of the core to the bottom of the core to provide a smooth transition from the center of the core to the top of the core, and a flexible mold body member including severely undercut outer peripheral surfaces and an upwardly and inwardly tapered bottom edge surface in surface to surface engagement with the sloped outer edge surface of the mold core and having a portion extending within and completely filling the central opening through the mold core, whereby the peripheral edge of the flexible mold body member may be pivoted upwardly and inwardly about the central portion of the core to permit removal of a form molded on the flexible body member from the flexible body member without damage to the form or the flexible body member or disconnecting the core and body member.

2. Structure as set forth in claim 1 wherein the mold core is constructed of aluminum.

3. Structure as set forth in claim 1 wherein the flexible mold body member is rubber.

4. A mold core of heat dissipating material having an outer periphery sloping toward the center of the core upwardly from the bottom thereof, an opening through the core centrally thereof having a venturi-like cross-section including larger diameter portions at the bottom of the core and the top of the core and a smaller diameter section centrally of the core changing gradually from the top of the core to the bottom of the core to provide a smooth transition from the center of the core to the top of the core, and a flexible mold body member including severely undercut outer peripheral surfaces and an upwardly and inwardly tapered bottom edge surface in surface to surface engagement with the sloped outer edge surface of the mold core and having a portion extending within and completely filling the central opening through the mold core, whereby the peripheral edge of the flexible mold body member may be pivoted upwardly and inwardly about the central portion of the core to permit removal of a form molded on the flexible body member from the flexible body member without damage to the form or the flexible body member or disconnecting the core and body member.

References Cited
UNITED STATES PATENTS

| | | |
|---|---|---|
| 2,596,028 | 5/1952 | James. |
| 2,614,310 | 10/1952 | James. |
| 2,714,226 | 8/1955 | Axelrad. |
| 2,907,070 | 10/1959 | Van Hartesveldt ____ 25—130 X |
| 3,104,425 | 9/1963 | Crane et al. _____ 18—2 X |
| 3,123,863 | 3/1964 | Reilly et al. _____ 18—19 |
| 3,126,582 | 3/1964 | Scott _____ 18—19 |
| 3,157,934 | 11/1964 | Williams. |
| 3,166,615 | 1/1965 | Farrell _____ 264—123 X |
| 3,290,418 | 12/1966 | Best _____ 18—35 X |

J. HOWARD FLINT, JR., *Primary Examiner.*